United States Patent
Tsorng et al.

(10) Patent No.: US 12,541,233 B2
(45) Date of Patent: Feb. 3, 2026

(54) ADAPTER FOR CHASSIS AND CABINET ASSEMBLY

(71) Applicant: Quanta Computer Inc., Taoyuan (TW)

(72) Inventors: Yaw-Tzorng Tsorng, Taoyuan (TW); Jen-Jia Liou, Taoyuan (TW); Wei-Jie Chen, Taoyuan (TW); Shao-Hsien Liu, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 154 days.

(21) Appl. No.: 18/605,669

(22) Filed: Mar. 14, 2024

(65) Prior Publication Data

US 2025/0224779 A1 Jul. 10, 2025

Related U.S. Application Data

(60) Provisional application No. 63/619,588, filed on Jan. 10, 2024.

(51) Int. Cl.
*G06F 1/18* (2006.01)
(52) U.S. Cl.
CPC .................................. *G06F 1/183* (2013.01)
(58) Field of Classification Search
CPC .......................................................... G06F 1/183
See application file for complete search history.

(56) References Cited

U.S. PATENT DOCUMENTS

| 6,123,203 | A | * | 9/2000 | Gibbons | ............... | H05K 7/1489 |
| | | | | | | 211/26 |
| 2016/0133661 | A1 | * | 5/2016 | Fujiuchi | ................ | H10F 39/806 |
| | | | | | | 257/432 |
| 2020/0107465 | A1 | | 4/2020 | Marrs et al. | | |

FOREIGN PATENT DOCUMENTS

| CN | 208061086 U | 11/2018 |
| TW | 201134349 A | 10/2011 |
| TW | 201424545 A | 6/2014 |

OTHER PUBLICATIONS

TW Office Action for Application No. 113117737 mailed Feb. 11, 2025, w/ First Office Action Summary, 9 pp.
TW Search Report for Application No. 113117737 mailed Feb. 11, 2025, w/ First Office Action, 1 p.

* cited by examiner

*Primary Examiner* — Jerry Wu
(74) *Attorney, Agent, or Firm* — NIXON PEABODY LLP

(57) ABSTRACT

An assembly kit for a computing system is disclosed. The assembly kit includes a mounting ear configured for attachment to a computer chassis, the computer chassis being configured to be received in a cabinet, the mounting ear having an L-shape formed by a first wall and a second wall, the second wall being perpendicular to the first wall, wherein the mounting ear is configured to receive a fastener configured for attaching the assembly kit to the cabinet; and an adapter releasably coupled to the mounting ear, the adapter having a third wall, a fourth wall that is perpendicular to the third wall, and a fifth wall that is perpendicular to the third wall, the fourth wall and the fifth wall being parallel. A space is formed between the fourth wall and the fifth wall, the space being configured to receive the fastener.

20 Claims, 9 Drawing Sheets

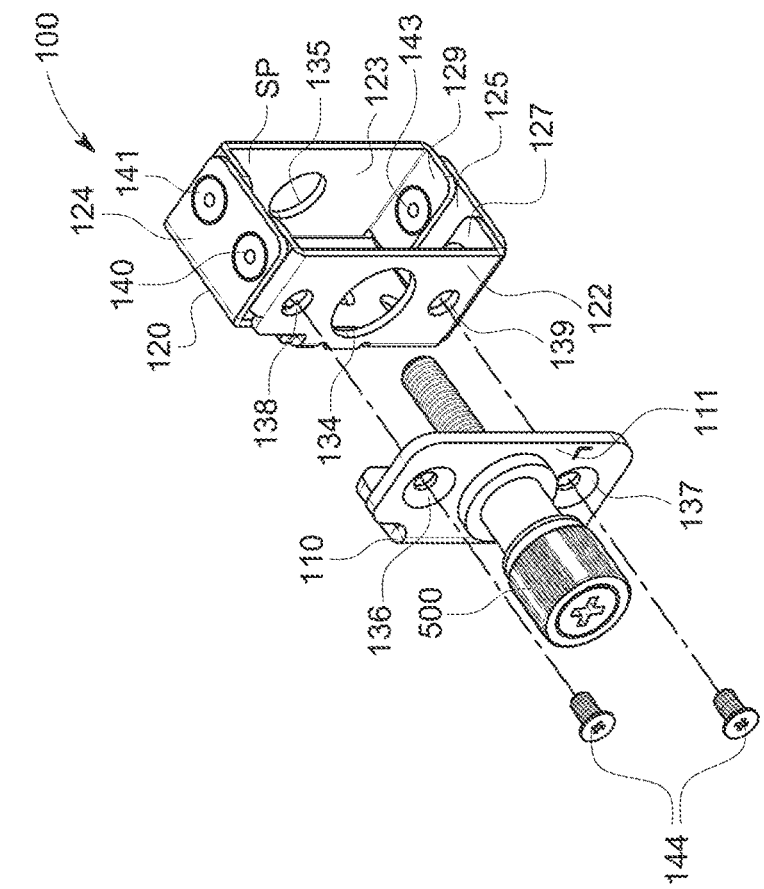

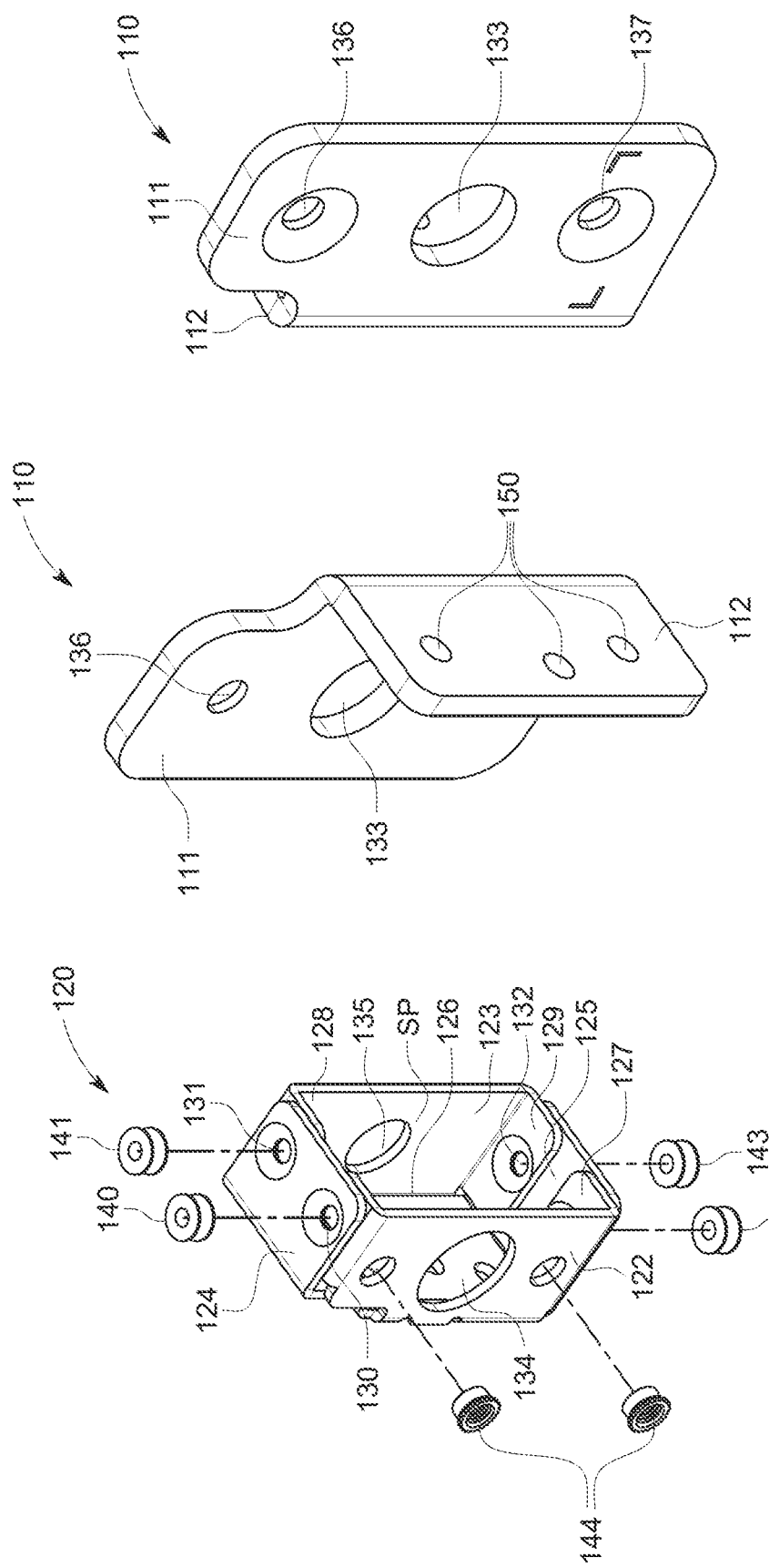

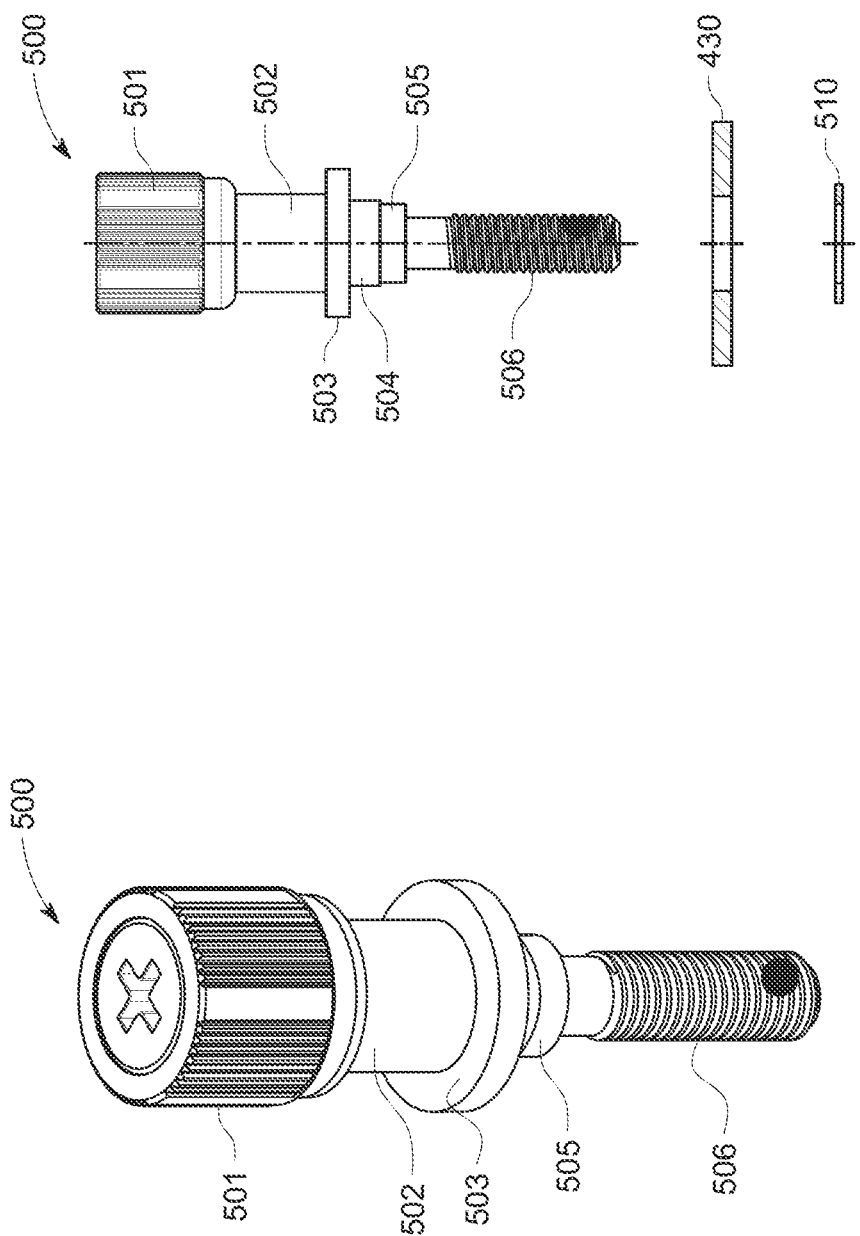

ADAPTER FOR CHASSIS AND CABINET ASSEMBLY

CROSS-REFERENCE TO RELATED APPLICATIONS

This application claims priority from and benefit of U.S. Provisional Patent Application Ser. No. 63/619,588, filed on Jan. 10, 2024, titled "DESIGN OF THE CHASSIS ADAPTER TO SOLVE THE DIFFERENT LENGTH CABINET ASSEMBLY," which is hereby incorporated by reference herein in its entirety.

FIELD OF THE INVENTION

The present invention relates generally to an assembly kit for a computing system, and more specifically, to an adaptor releasably coupled to a mounting ear configured for attachment to a computer chassis. An adaptor having a proper size or length can be used based on an enclosure depth of a cabinet assembly to secure a sufficient cable routing space within the cabinet assembly in which the computer chassis is installed.

BACKGROUND OF THE INVENTION

There are several types of computing/5G cabinet specifications on the market, and the depth dimensions are not consistent among the different cabinet specifications. As a result, when a computer chassis is installed in a cabinet, there may be insufficient space for cable routing in the cabinet, depending on the cabinet specification and/or a size of the cabinet and/or a size of the computer chassis. That is, there are various sizes of cabinets and computer chassis available on the market and an enclosure depth of one cabinet may not be compatible with a certain computer chassis to create an enough space for cable routing in the cabinet and chassis assembly. However, replacing existing cabinets with new cabinets to accommodate the incompatible computer chassis may be very costly.

Therefore, a need exists for solving the problem of a limited cable routing space in an existing cabinet without replacing it with a new cabinet. A need also exists for securing a sufficient cable routing space in a limited space of the existing cabinet without many complications.

SUMMARY OF THE INVENTION

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

In view of the above-described problem with various cabinet specifications, the present application discloses an assembly kit including a chassis adaptor. Using the adaptor and/or adjusting the length of the adaptor provides a way to adjust the depth of the assembled chassis into the cabinet, securing a sufficient cable routing space in the cabinet. Thus, an existing cabinet can be used with the assembly kit without replacing the cabinet with a new cabinet. The adaptor makes it possible to provide a sufficient cable routing space at the back of the computer chassis in the cabinet and chassis assembly despite the limited space provided by the cabinet. The adaptor length can be adjusted easily by using an adaptor with a proper length depending on the cable routing requirement in the cabinet and chassis assembly. For example, by using an adaptor having a longer length, more cable routing space can be generated in the cabinet and chassis assembly.

According to certain aspects of the present disclosure, an assembly kit for a computing system is disclosed. According to various embodiments, the assembly kit includes: a mounting ear configured for attachment to a computer chassis, the computer chassis being configured to be received in a cabinet, the mounting ear having an L-shape formed by a first wall and a second wall, the second wall being perpendicular to the first wall, wherein the mounting ear is configured to receive a fastener configured for attaching the assembly kit to the cabinet; and an adapter releasably coupled to the mounting ear, the adapter having a third wall, a fourth wall that is perpendicular to the third wall, and a fifth wall that is perpendicular to the third wall, the fourth wall and the fifth wall being parallel. A space is formed between the fourth wall and the fifth wall, the space being configured to receive the fastener.

In various embodiments, the adapter further has: a third wall top member perpendicularly extending from a top of the third wall and a third wall bottom member perpendicularly extending from a bottom of the third wall, the third wall top member and the third wall bottom member being parallel; a fourth wall top member perpendicularly extending from a top of the fourth wall and a fourth wall bottom member perpendicularly extending from a bottom of the fourth wall, the fourth wall top member and the fourth wall bottom member being parallel; and a fifth wall top member perpendicularly extending from a top of the fifth wall and a fifth wall bottom member perpendicularly extending from a bottom of the fifth wall, the fifth wall top member and the fifth wall bottom member being parallel.

In various embodiments, each of the fourth wall top member and the fifth wall top member is in contact with the third wall top member, and each of the fourth wall bottom member and the fifth wall bottom member is in contact with the third wall bottom member.

In various embodiments, the third wall top member has two through-holes including a first through-hole and a second through-hole; the fourth wall top member has a through-hole corresponding to the first through-hole; the fifth wall top member has a through-hole corresponding to the second through-hole; a first fastener is received by the through-hole of the fourth wall top member and the corresponding first through-hole; and a second fastener is received by the through-hole of the fifth wall top member and the corresponding second through-hole.

In various embodiments, the third wall bottom member has two through-holes including a third through-hole and a fourth through-hole; the fourth wall bottom member has a through-hole corresponding to the third through-hole; the fifth wall bottom member has a through-hole corresponding to the fourth through-hole; a third fastener is received by the through-hole of the fourth wall bottom member and the corresponding third through-hole; and a fourth fastener is received by the through-hole of the fifth wall bottom member and the corresponding fourth through-hole.

In various embodiments, the fourth wall top member does not contact the fifth wall top member, and the fourth wall bottom member does not contact the fifth wall bottom member.

In various embodiments, each of the first fastener, the second fastener, the third fastener, and the fourth fastener includes a rivet.

In various embodiments, the first wall contacts the fourth wall when the adapter is coupled to the mounting ear.

In various embodiments, each of the first wall, the fourth wall, and the fifth wall has a corresponding through-hole through which the fastener passes.

In various embodiments, the fastener is at least partially threaded or comprises a screw and configured to be fastened to the cabinet.

In various embodiments, a knob is connected to one end of the fastener, the knob being located outside the space formed between the fourth wall and the fifth wall, and a threaded portion of the fastener being located at the space formed between the fourth wall and the fifth wall.

In various embodiments, each of the first wall and the fourth wall has corresponding at least one or two corresponding through-holes configured to receive a wall fastener releasably fixing the mounting ear to the adapter.

In various embodiments, the wall fastener comprises a screw.

In various embodiments, the second wall contacts the third wall when the adapter is coupled to the mounting ear, each of the second wall and the third wall having at least one, two, or three corresponding through-holes configured to receive a fastener releasably fixing the assembly kit to the computer chassis.

In various embodiments, a length of the adapter, which corresponds to a distance between the fourth wall and the fifth wall, is in a range of about 20 millimeters (mm) to about 30 mm.

In various embodiments, the length of the adapter is 20 mm, 22 mm, 24 mm, 26 mm, 28 mm, 30 mm, about 20 mm, about 22 mm, about 24 mm, about 26 mm, about 28 mm, or about 30 mm.

According to other aspects of the present disclosure, a computing system is disclosed. According to various embodiments, the computing system includes a cabinet having a front portion and a rear portion; a computer chassis, wherein the cabinet is configured to receive the computer chassis; and an assembly kit configured to be releasably fixed to the computer chassis. The assembly kit includes: a mounting ear having a first wall and a second wall that is perpendicular to the first wall; and an adapter configured to be releasably coupled to the mounting ear, the adapter having a third wall, a fourth wall that is perpendicular to the third wall, and a fifth wall that is perpendicular to the third wall, the fourth wall and the fifth wall being parallel, and a space being formed between the fourth wall and the fifth wall.

In various embodiments, a rear space is formed between outside of a rear end of the received computer chassis and inside of a rear end of the cabinet. In various embodiments, a size of the rear space or a distance between the outside of the rear end of the received computer chassis and the inside of the rear end of the cabinet is determined based on a length of the adapter corresponding to a distance between the fourth wall and the fifth wall and a length of the computer chassis received in the cabinet.

In various embodiments, the length of the adapter is in a range of about 20 millimeters (mm) to about 30 mm, or the length of the adapter is 20 mm, 22 mm, 24 mm, 26 mm, 28 mm, 30 mm, about 20 mm, about 22 mm, about 24 mm, about 26 mm, about 28 mm, or about 30 mm.

In various embodiments, the length of the adapter is longer in the computing system when the computer chassis has a longer length, and the length of the adapter is shorter in the computing system when the computer chassis has a shorter length such that a depth of the computer chassis received in the cabinet is adjustable by using the adapter with an appropriate length.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of representative embodiments together with reference to the accompanying drawings. These drawings depict only representative embodiments, and are therefore not to be considered as limitations on the scope of the various embodiments or claims.

FIG. 3A is a first perspective view of an assembly kit, according to certain aspects of the present disclosure.

FIG. 3B is a second perspective view of the assembly kit, according to certain aspects of the present disclosure.

FIG. 4A is a perspective view of an adaptor, according to certain aspects of the present disclosure.

FIG. 4B is a first perspective view of a mounting ear, according to certain aspects of the present disclosure.

FIG. 4C is a second perspective view of the mounting ear shown in FIG. 4B, according to certain aspects of the present disclosure.

FIG. 5A is a perspective view of a fastener, according to certain aspects of the present disclosure.

FIG. 5B is a side view of a fastener and a panel, according to certain aspects of the present disclosure.

Figure 1:
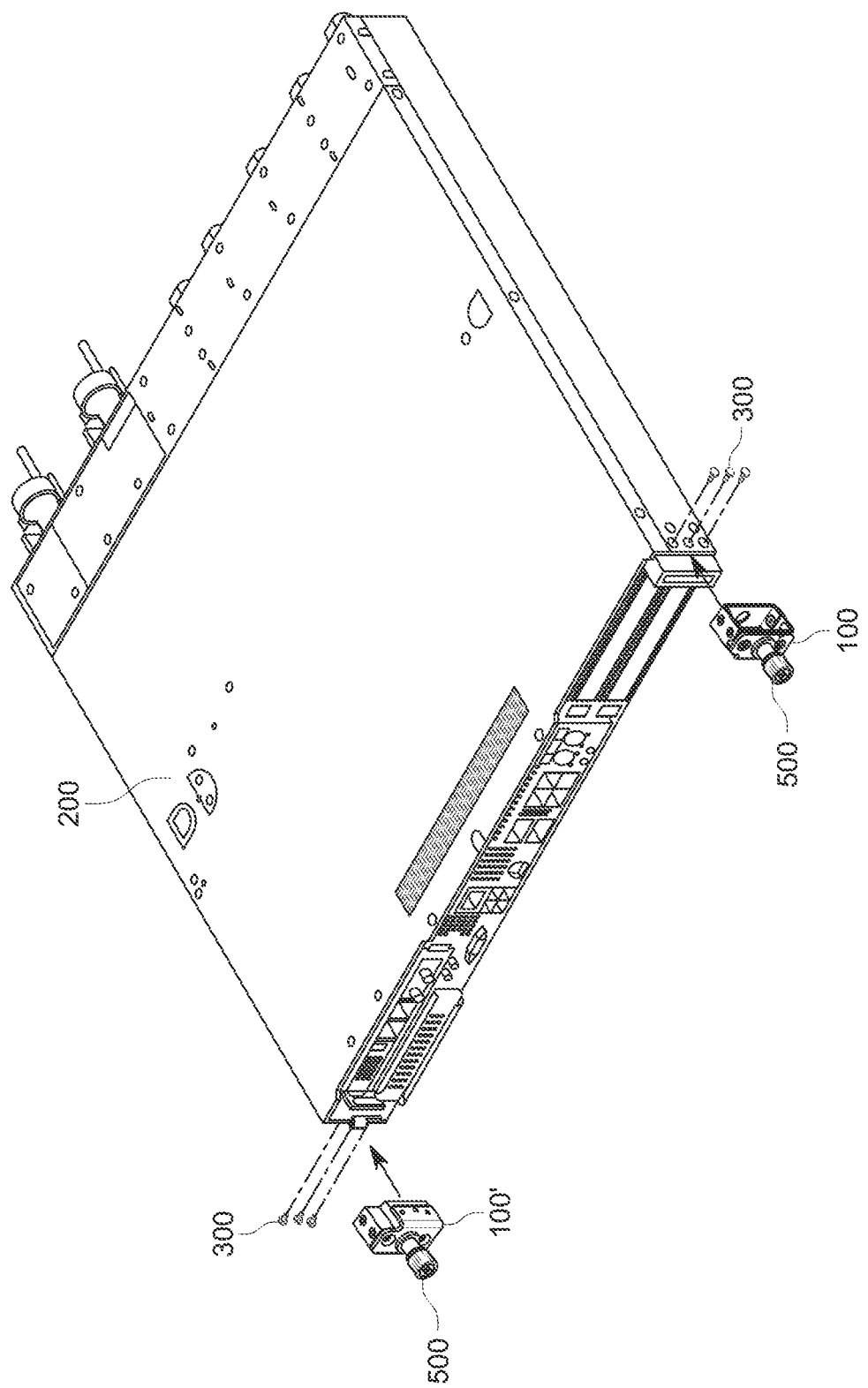
FIG. 1 is a perspective view of a computer chassis and two assembly kits, according to certain aspects of the present disclosure.

Elements in the figures are illustrated for simplicity and clarity and have not necessarily been drawn to scale. For example, the dimensions and/or relative positioning of some of the elements in the figures may be exaggerated relative to other elements to help improve understanding of various features.

While the present disclosure is susceptible to various modifications and alternative forms, specific implementations have been shown by way of example in the drawings and will be described in further detail herein. It should be understood, however, that the present disclosure is not intended to be limited to the particular forms disclosed. Rather, the present disclosure is to cover all modifications, equivalents, and alternatives falling within the spirit and scope of the present disclosure as defined by the appended claims.

DETAILED DESCRIPTION

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near," "nearly at," "within 3-5% of," "within acceptable manufacturing tolerances of," or any logical combination thereof. Similarly, terms "vertical" or "horizontal" are intended to additionally include "within 3-5% of" a vertical or horizontal orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein.

FIG. 1 shows an assembly kit 100 and a computer chassis 200. The assembly kit 100 is attached to the computer chassis 200. In some embodiments, the assembly kit 100 is attached to a lateral side of the computer chassis 200. In some embodiments, a pair of assembly kits is attached to two lateral sides of the computer chassis 200, a first assembly kit 100 being attached to a right side of the computer chassis 200, and a second assembly kit 100' being attached to a left side of the computer chassis 200. In some embodiments, the assembly kit 100 is attached to a front portion of the lateral side of the computer chassis 200. In some embodiments, at least one fastener 300 is used to attach the assembly kit 100 to the computer chassis. For example, a number of the fastener 300 is one, two, or three. In some embodiments, the fastener 300 is a screw.

Figure 2:
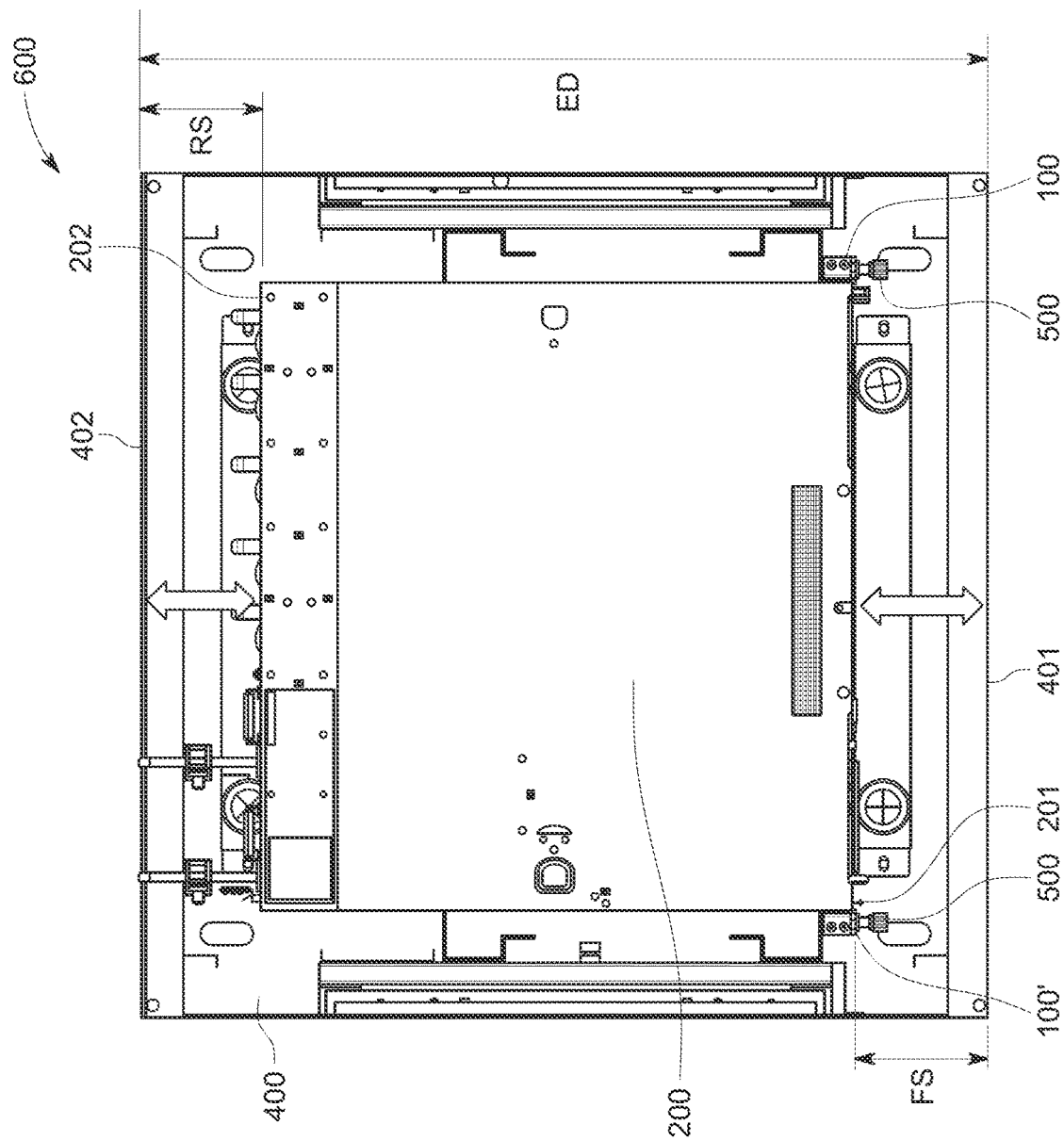
FIG. 2 is a top view of a cabinet and chassis assembly, according to certain aspects of the present disclosure.
Figure 3D:
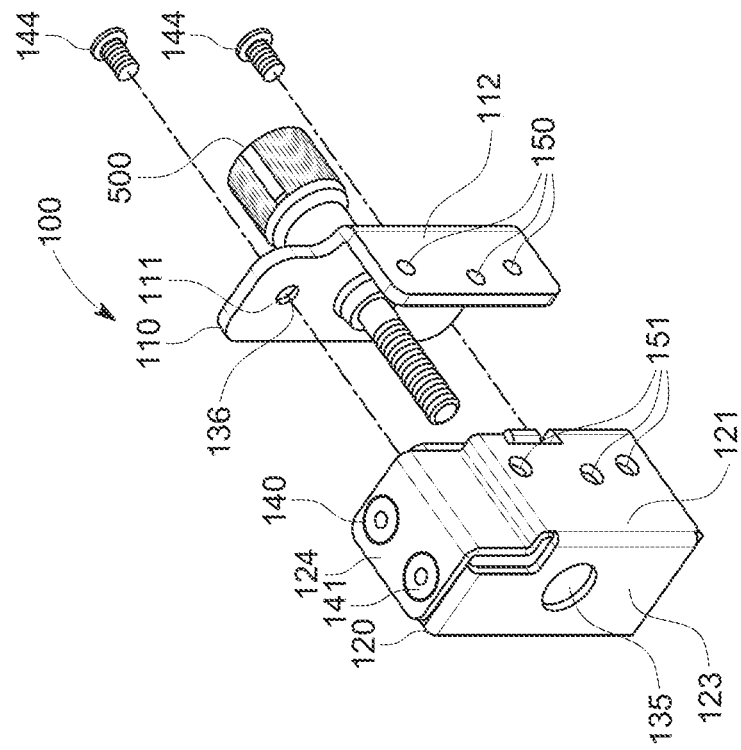
FIG. 3D is a fourth perspective view of the assembly kit, according to certain aspects of the present disclosure.
Figure 3C:
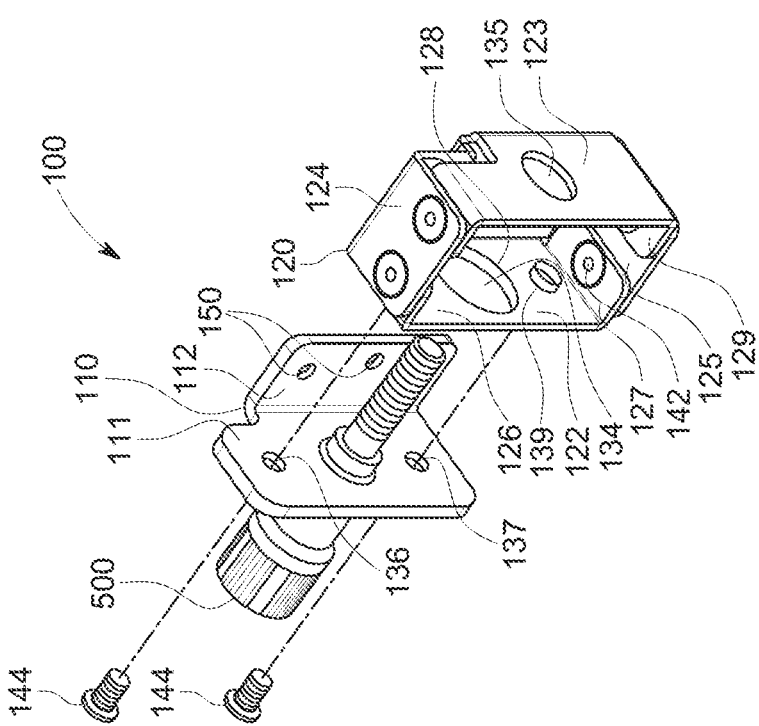
FIG. 3C is a third perspective view of the assembly kit, according to certain aspects of the present disclosure.

The computer chassis 200 with the assembly kit 100 attached thereto is installed in a cabinet 400, as shown in FIG. 2. FIG. 2 is a top view of the cabinet 400 and the computer chassis 200 assembly. Referring to FIG. 2, a front cable routing space FS is formed between the front end 401 of the cabinet 400 and the front 201 of the computer chassis 200. Further, a rear cable routing space RS is formed between the rear end 402 of the cabinet 400 and the rear end 202 of the computer chassis 200. The enclosure depth ED of the cabinet 400 may be different based on a manufacturer's design and there may be various sizes of cabinets manufactured by different manufacturers. For example, there are several different 5G cabinet specifications on the market, and their enclosure depths may be different. That is, the enclosure depth ED of the cabinets 400 is not consistent. As a result, when a computer chassis 200 is installed in a cabinet 400, there may be insufficient space for cable routing, in particular, at the rear cable routing space RS.

FIGS. 3A-3D are various views of an assembly kit, according to certain aspects of the present disclosure. According to various embodiments, the assembly kit 100 includes a mounting ear 110 and an adapter 120. The mounting ear 110 is configured for attachment to a computer chassis 200. The assembly kit 100 is also configured for attachment to a computer chassis 200, as shown in FIG. 1. As shown in FIG. 2, the computer chassis 200 is configured to be received in a cabinet 400. In various embodiments, the mounting ear 110 has an L-shape formed by a first wall 111 and a second wall 112. As shown in FIGS. 3A-3D, 4B, and 4C, the second wall 112 is perpendicular to the first wall 111. The mounting ear 110 is configured to receive a fastener 500 configured for attaching the assembly kit 100 to the cabinet 400. The adapter 120 is releasably coupled to the mounting ear 110. The adapter 120 has a third wall 121, a fourth wall 122 that is perpendicular to the third wall 121, and a fifth wall 123 that is perpendicular to the third wall 121. The fourth wall 122 and the fifth wall 123 are parallel. A space SP is formed between the fourth wall 122 and the fifth wall 123, as shown in FIG. 4A, and the space SP is configured to receive the fastener 500.

Referring to FIGS. 3A-3D and 4A, in various embodiments, the adapter 120 further has a third wall top member 124 perpendicularly extending from a top of the third wall 121 and a third wall bottom member 125 perpendicularly extending from a bottom of the third wall 121. The third wall top member 124 and the third wall bottom member 125 are parallel. Referring to FIG. 4A, the adapter 120 further has a fourth wall top member 126 perpendicularly extending from a top of the fourth wall 122 and a fourth wall bottom member 127 perpendicularly extending from a bottom of the fourth wall 122. The fourth wall top member 126 and the fourth wall bottom member 127 are parallel. The adapter 120 further has a fifth wall top member 128 perpendicularly extending from a top of the fifth wall 123 and a fifth wall bottom member 129 perpendicularly extending from a bottom of the fifth wall 123. The fifth wall top member 128 and the fifth wall bottom member 129 are parallel.

Further referring to FIGS. 3A-3D and 4A, in various embodiments, each of the fourth wall top member 126 and the fifth wall top member 128 is in contact with the third wall top member 124. Further, each of the fourth wall bottom member 127 and the fifth wall bottom member 129 is in contact with the third wall bottom member 125. In various embodiments, the third wall top member 124 and the third wall bottom member 125 provide outer surfaces of the assembly kit 100.

Further referring to FIGS. 3A-3D and 4A, in various embodiments, the third wall top member 124 has two through-holes including a first through-hole 130 and a second through-hole 131. The fourth wall top member 126 has a through-hole (not shown in drawings) corresponding to the first through-hole 130, and the fifth wall top member 128 has a through-hole (not shown in drawings) corresponding to the second through-hole 131. A first fastener 140 is received by the through-hole of the fourth wall top member 126 and the corresponding first through-hole 130, and a second fastener 141 is received by the through-hole of the fifth wall top member 128 and the corresponding second through-hole 131.

Further referring to FIGS. 3A-3D and 4A, in various embodiments, the third wall bottom member 125 has two through-holes including a third through-hole (not shown in drawings) and a fourth through-hole (not shown in drawings). The fourth wall bottom member 127 has a through-hole (not shown in drawings) corresponding to the third through-hole, and the fifth wall bottom member 129 has a through-hole 132 corresponding to the fourth through-hole. A third fastener 142 is received by the through-hole of the fourth wall bottom member 127 and the corresponding third through-hole, and a fourth fastener 143 is received by the through-hole 132 of the fifth wall bottom member 129 and the corresponding fourth through-hole.

Further referring to FIGS. 3A-3D and 4A, in various embodiments, the fourth wall top member 126 does not contact the fifth wall top member 128, and the fourth wall bottom member 127 does not contact the fifth wall bottom member 129. For example, each of the first fastener 140, the second fastener 141, the third fastener 142, and the fourth fastener 143 includes a rivet.

Referring to FIGS. 3A-3D, the first wall 111 contacts the fourth wall 122 when the adapter 120 is coupled to the mounting ear 110. Referring to FIGS. 3A-3D and 4A-4C, in various embodiments, each of the first wall 111, the fourth wall 122, and the fifth wall 123 has a corresponding through-hole 133, 134, 135, respectively, through which the fastener 500 passes. In various embodiments, the size of the through-hole 134 of the fourth wall 122 is greater than the size of the through-hole 135 of the fifth wall 123.

Figure 5C:
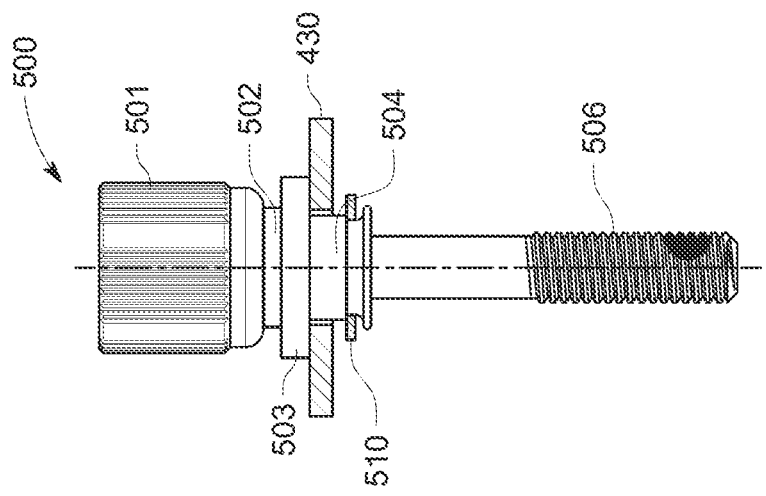
FIG. 5C is a side view of the fastener inserted into the panel, but not fastened, according to certain aspects of the present disclosure.
Figure 5D:
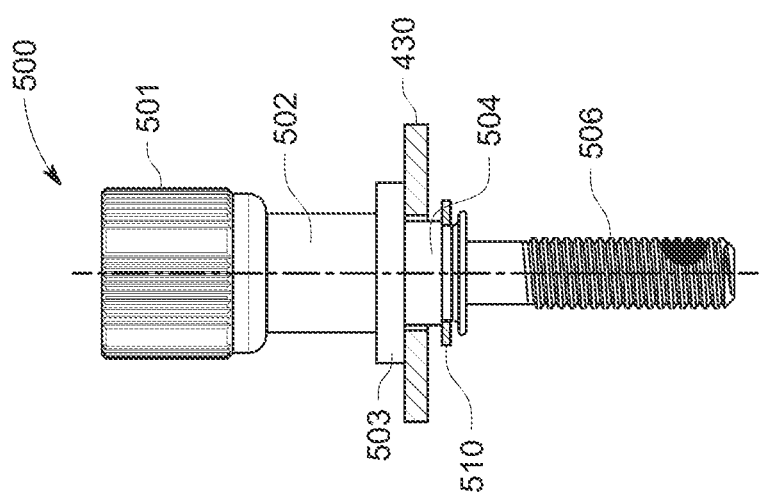
FIG. 5D is a side view of the fastener inserted into the panel and fastened, according to certain aspects of the present disclosure.

Referring to FIGS. 5A-5D, in various embodiments, the fastener 500 is at least partially threaded or includes a screw portion 506 and configured to be fastened to the cabinet 400, as exemplified in FIG. 2. For example, the fastener 500 is a thumbscrew. In various embodiments, a knob 501 is at one end of the fastener 500. In various embodiments, the fastener 500 further includes a ferrule 502, a first end of the ferrule 502 being connected to the knob 501. In various embodiments, the fastener 500 further includes a first ring portion 503, a second ring portion 504, and a third ring portion 505. The diameter of the first ring portion 503 is greater than the diameter of the second ring portion 504, and the diameter of the second ring portion 504 is greater than the third ring portion 505. A second end of the ferrule 502 is connected to the first ring portion 503 to which the second ring portion 504 is connected. The third ring portion 505 is connected to the second ring portion 504. The knob 501 is located outside the space SP formed between the fourth wall 122 and the fifth wall 123, and at least a portion of the threaded/screw portion 506 of the fastener 500 is located at the space SP formed between the fourth wall 122 and the fifth wall 123, as exemplified in FIGS. 6B, 7A, and 7B. In some embodiments, a washer 510 is used such that the screw portion 506 is inserted into the washer 510, as shown in FIGS. 5C and 5D.

FIG. 5C shows the fastener 500 inserted into a cabinet panel 430, but the fastener 500 is not fastened. The second ring portion 504 passes through the cabinet panel 430, and the first ring portion 503 is outside the cabinet panel 430. The washer 510 receiving the screw portion 506 is inside the cabinet panel 430. FIG. 5D shows that the fastener 500 that has been fastened, such that the screw portion 506 is farther from the cabinet panel 430, compared to the unfastened fastener 500 shown in FIG. 5C.

Referring to FIGS. 3A-3D, in various embodiments, each of the first wall 111 and the fourth wall 122 has corresponding at least one or two corresponding through-holes 136/137, 138/139, respectively, configured to receive a wall fastener 144 releasably fixing the mounting ear 110 to the adapter 120. For example, the wall fastener 144 includes a screw. In various embodiments, the second wall 112 of the mounting ear 110 contacts the third wall 121 of the adapter 120 when the adapter 120 is coupled to the mounting ear 110. In various embodiments, each of the second wall 112 and the third wall 121 has at least one, two, or three corresponding through-holes 150, 151, respectively, configured to receive a fastener 300 releasably fixing the assembly kit 100 to the computer chassis 200, as exemplified in FIG. 1.

Figure 6A:
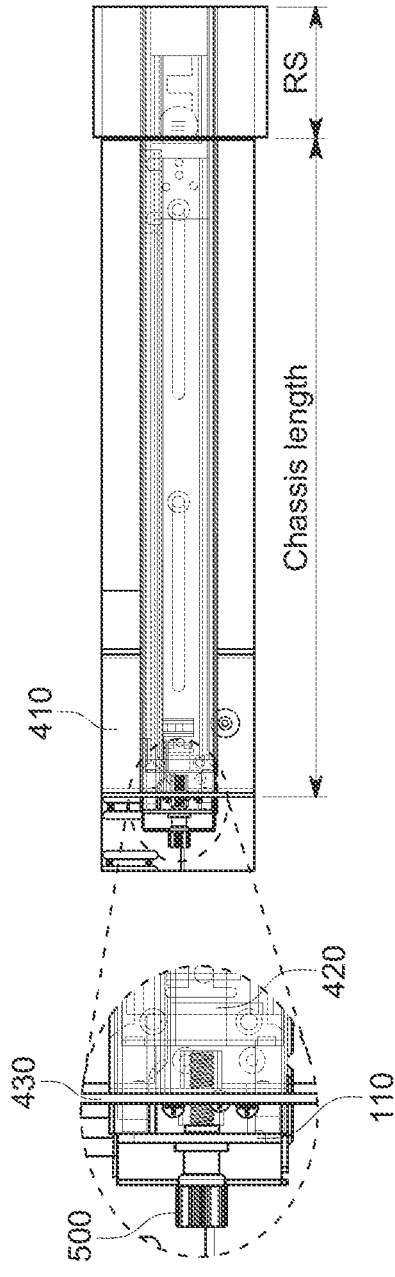
FIG. 6A is a side view of a portion of a cabinet and chassis assembly, a mounting ear being attached to a computer chassis without an adaptor, according to certain aspects of the present disclosure.
Figure 6B:
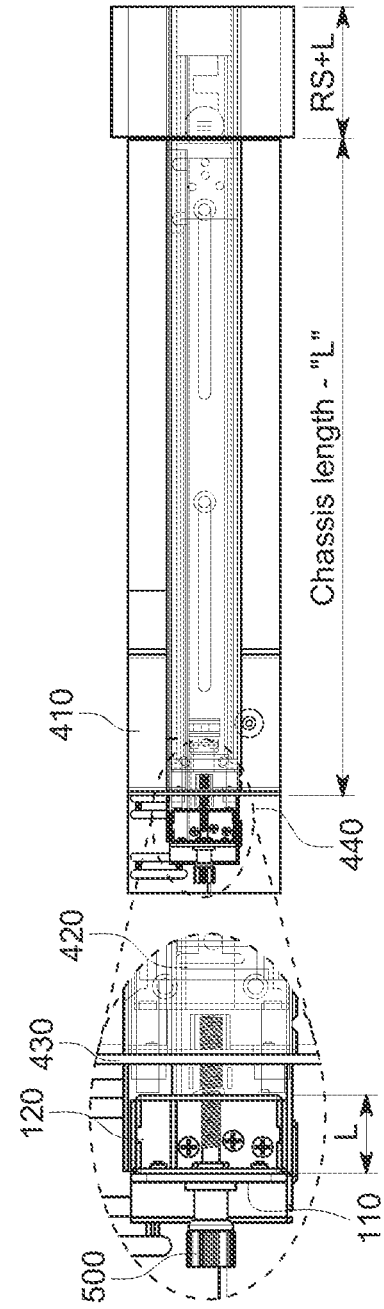
FIG. 6B is a side view of a portion of a cabinet and chassis assembly, a mounting ear and an adapter being attached to a computer chassis, according to certain aspects of the present disclosure.

FIGS. 6A and 6B are side views of a portion of a cabinet 400 and chassis 200 assembly, according to certain aspects of the present disclosure. In FIG. 6A, only the mounting ear 110 is used without an adapter for coupling of the mounting ear 110 to the computer chassis 200, and in FIG. 6B, both the mounting ear 110 and the adapter 120 are used for coupling of the assembly kit 100 to the computer chassis 200. FIG. 6A shows a fastener 500, a mounting ear 110, a cabinet post 410, a rail kit 420, a cabinet panel 430, and an assembly datum 440, and FIG. 6B further shows an adapter 120 in addition to the fastener 500, mounting ear 110, cabinet post 410, rail kit 420, cabinet panel 430, and assembly datum 440. Referring to FIG. 6A, when the fastener 500 passing through the through-hole 133 of the first wall 111 of the mounting ear 110 is coupled to the cabinet panel 430 of the cabinet 400, a rear cable routing space RS having a first size is generated. Referring to FIG. 6B, when an assembly kit 100, including the mounting ear 110 and the adapter 120, is used, the fastener 500 passes through the space SP formed between the fourth wall 122 and the fifth wall 123 to be coupled to the cabinet panel 430 of the cabinet 400. As shown in FIG. 6B, when the adapter 120 is used with the mounting ear 110 for installation of the computer chassis 200 in the cabinet 400, the length L of the space SP is added to the rear cable routing space RS such that the rear cable routing space RS having the first size plus L is generated. Accordingly, by adjusting the length L of the adapter 120, the depth of the assembled computer chassis 200 and cabinet 400 can be controlled to secure a sufficient rear cable routing depth RS.

Figure 7B:
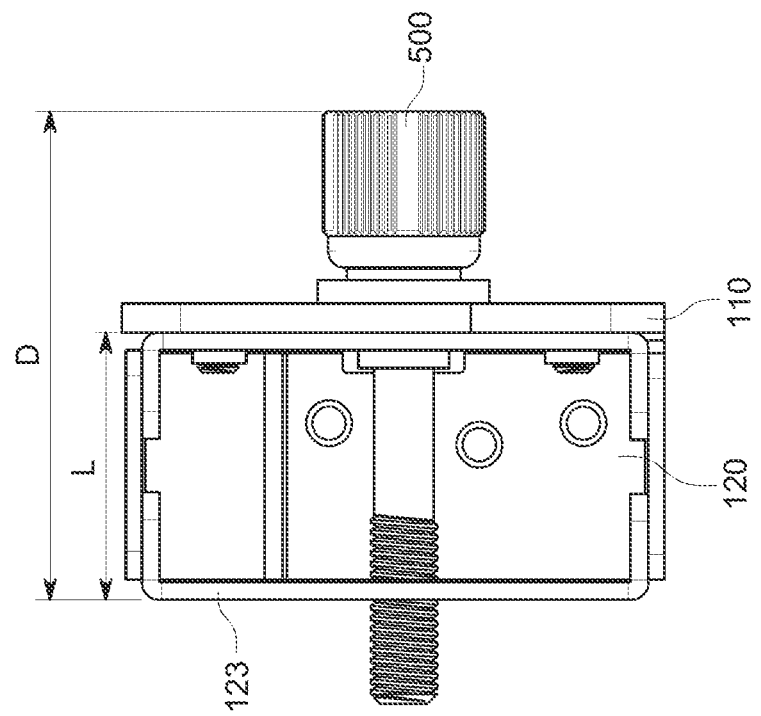
FIG. 7B is a side view of a fastener inserted into an assembly kit and fastened, according to certain aspects of the present disclosure.
Figure 7A:
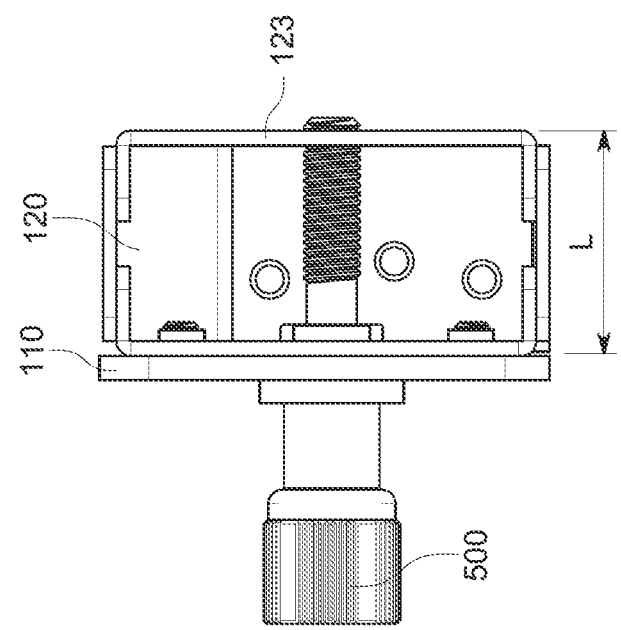
FIG. 7A is a side view of a fastener inserted into an assembly kit, but not fastened, according to certain aspects of the present disclosure.

FIG. 7A is a side view of a fastener 500 inserted into an assembly kit 100, but not fastened/unfastened, according to certain aspects of the present disclosure. FIG. 7B is a side view of a fastener 500 inserted into an assembly kit 100 and fastened, according to certain aspects of the present disclosure.

Referring to FIGS. 6B, 7A, and 7B, in various embodiments, the length L of the adapter 120, which corresponds to a distance between the fourth wall 122 and the fifth wall 123, is in a range of about 20 millimeters (mm) to about 30 mm. For example, the length L of the adapter is 20 mm, 22 mm, 24 mm, 26 mm, 28 mm, 30 mm, about 20 mm, about 22 mm, about 24 mm, about 26 mm, about 28 mm, or about 30 mm. The adapter 120 length L can be adjusted according to the cable routing requirements in the cabinet 400. If the length L of the adapter 120 is longer, more cable routing space can be generated. Referring to FIG. 7B, in various embodiments, the distance D between the end of the knob 501 of the fastener 500 and the fifth wall 123 of the adapter 120 is in a range of about 36 mm to about 47 mm or in a range of about 36.8 mm to about 46.8 mm, when the fastener 500 is completely fastened or compressed.

According to other aspects of the present disclosure, a computing system 600 is disclosed, as shown in FIG. 2. According to various embodiments, the computing system 600 includes a cabinet 400 having a front end 401 and a rear end 402 and a computer chassis 200. The cabinet 400 is configured to receive the computer chassis 200. An assembly kit 100 is releasably fixed to the computer chassis 200. In various embodiments, a rear cable routing space RS is formed between outside of a rear end 202 of the received computer chassis 200 and inside of the rear end 402 of the cabinet 400. In various embodiments, a size of the rear cable routing space RS or a distance between the outside of the rear end 202 of the received computer chassis 200 and the inside of the rear end 402 of the cabinet 400 is determined based on a length L of the adapter 120 corresponding to a distance between the fourth wall 122 and the fifth wall 123 and a length of the computer chassis 200 received in the cabinet 400. See FIGS. 2, 6B, 7A, and 7B.

In various embodiments, the length L of the adapter 120 is longer in the computing system 600 when the computer chassis 200 has a longer length, and the length L of the adapter 120 is shorter in the computing system 600 when the computer chassis 200 has a shorter length such that a depth of the computer chassis 200 received in the cabinet 400 is adjustable by using the adapter 120 with an appropriate length L.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular examples only and is not intended to be limiting of the disclosure. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this disclosure belongs. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present disclosure have been described above, it should be understood that they have been presented by way of example only, and not limitation. Numerous changes to the disclosed embodiments can be made in accordance with the disclosure herein, without departing from the spirit or scope of the disclosure. Thus, the breadth and scope of the present disclosure should not be limited by any of the above described embodiments. Rather, the scope of the disclosure should be defined in accordance with the following claims and their equivalents.

What is claimed is:

1. An assembly kit for a computing system, the assembly kit comprising:
    a mounting ear configured for attachment to a computer chassis, the computer chassis being configured to be received in a cabinet, the mounting ear having an L-shape formed by a first wall and a second wall, the second wall being perpendicular to the first wall, wherein the mounting ear is configured to receive a fastener configured for attaching the assembly kit to the cabinet; and
    an adapter releasably coupled to the mounting ear, the adapter having a third wall, a fourth wall that is perpendicular to the third wall, and a fifth wall that is perpendicular to the third wall, the fourth wall and the fifth wall being parallel, a space being formed between the fourth wall and the fifth wall, the space being configured to receive the fastener,
    wherein the adapter further has:
    a third wall top member perpendicularly extending from a top of the third wall and a third wall bottom member perpendicularly extending from a bottom of the third wall, the third wall top member and the third wall bottom member being parallel; and
    a fourth wall top member perpendicularly extending from a top of the fourth wall and a fourth wall bottom member perpendicularly extending from a bottom of the fourth wall, the fourth wall top member and the fourth wall bottom member being parallel.

2. The assembly kit of claim 1, wherein the adapter further has:
    a fifth wall top member perpendicularly extending from a top of the fifth wall and a fifth wall bottom member perpendicularly extending from a bottom of the fifth wall, the fifth wall top member and the fifth wall bottom member being parallel.

3. The assembly kit of claim 2, wherein each of the fourth wall top member and the fifth wall top member is in contact with the third wall top member, and each of the fourth wall bottom member and the fifth wall bottom member is in contact with the third wall bottom member.

4. The assembly kit of claim 3, wherein:
the third wall top member has two through-holes including a first through-hole and a second through-hole;
the fourth wall top member has a through-hole corresponding to the first through-hole;
the fifth wall top member has a through-hole corresponding to the second through-hole;
a first fastener is received by the through-hole of the fourth wall top member and the corresponding first through-hole; and
a second fastener is received by the through-hole of the fifth wall top member and the corresponding second through-hole.

5. The assembly kit of claim 4, wherein:
the third wall bottom member has two through-holes including a third through-hole and a fourth through-hole;
the fourth wall bottom member has a through-hole corresponding to the third through-hole;
the fifth wall bottom member has a through-hole corresponding to the fourth through-hole;
a third fastener is received by the through-hole of the fourth wall bottom member and the corresponding third through-hole; and
a fourth fastener is received by the through-hole of the fifth wall bottom member and the corresponding fourth through-hole.

6. The assembly kit of claim 5, wherein the fourth wall top member does not contact the fifth wall top member, and the fourth wall bottom member does not contact the fifth wall bottom member.

7. The assembly kit of claim 5, wherein each of the first fastener, the second fastener, the third fastener, and the fourth fastener comprises a rivet.

8. The assembly kit of claim 1, the first wall contacts the fourth wall when the adapter is coupled to the mounting ear.

9. The assembly kit of claim 8, wherein each of the first wall, the fourth wall, and the fifth wall has a corresponding through-hole through which the fastener passes.

10. The assembly kit of claim 9, wherein the fastener is at least partially threaded or comprises a screw and configured to be fastened to the cabinet.

11. The assembly kit of claim 9, wherein a knob is connected to one end of the fastener, the knob being located outside the space formed between the fourth wall and the fifth wall, and a threaded portion of the fastener being located at the space formed between the fourth wall and the fifth wall.

12. The assembly kit of claim 9, wherein each of the first wall and the fourth wall has corresponding at least one or two corresponding through-holes configured to receive a wall fastener releasably fixing the mounting ear to the adapter.

13. The assembly kit of claim 12, wherein the wall fastener comprises a screw.

14. The assembly kit of claim 8, wherein the second wall contacts the third wall when the adapter is coupled to the mounting ear, each of the second wall and the third wall having at least one, two, or three corresponding through-holes configured to receive a fastener releasably fixing the assembly kit to the computer chassis.

15. The assembly kit of claim 14, wherein a length of the adapter, which corresponds to a distance between the fourth wall and the fifth wall, is in a range of about 20 millimeters (mm) to about 30 mm.

16. The assembly kit of claim 15, wherein the length of the adapter is 20 mm, 22 mm, 24 mm, 26 mm, 28 mm, 30 mm, about 20 mm, about 22 mm, about 24 mm, about 26 mm, about 28 mm, or about 30 mm.

17. A computing system comprising:
a cabinet having a front portion and a rear portion;
a computer chassis, wherein the cabinet is configured to receive the computer chassis; and
an assembly kit configured to be releasably fixed to the computer chassis,
wherein the assembly kit comprises:
a mounting ear having a first wall and a second wall that is perpendicular to the first wall, wherein the mounting ear is configured to receive a fastener configured for attaching the assembly kit to the cabinet; and
an adapter configured to be releasably coupled to the mounting ear, the adapter having a third wall, a fourth wall that is perpendicular to the third wall, and a fifth wall that is perpendicular to the third wall, the fourth wall and the fifth wall being parallel, and a space being formed between the fourth wall and the fifth wall, the space being configured to receive the fastener,
wherein the adapter further has:
a third wall top member perpendicularly extending from a top of the third wall and a third wall bottom member perpendicularly extending from a bottom of the third wall, the third wall top member and the third wall bottom member being parallel; and
a fourth wall top member perpendicularly extending from a top of the fourth wall and a fourth wall bottom member perpendicularly extending from a bottom of the fourth wall, the fourth wall top member and the fourth wall bottom member being parallel.

18. The computing system of claim 17, wherein:
a rear space is formed between outside of a rear end of the received computer chassis and inside of a rear end of the cabinet; and
a size of the rear space or a distance between the outside of the rear end of the received computer chassis and the inside of the rear end of the cabinet is determined based on a length of the adapter corresponding to a distance between the fourth wall and the fifth wall and a length of the computer chassis received in the cabinet.

19. The computing system of claim 18, wherein the length of the adapter is in a range of about 20 millimeters (mm) to about 30 mm, or the length of the adapter is 20 mm, 22 mm, 24 mm, 26 mm, 28 mm, 30 mm, about 20 mm, about 22 mm, about 24 mm, about 26 mm, about 28 mm, or about 30 mm.

20. The computing system of claim 18, wherein the length of the adapter is longer in the computing system when the computer chassis has a longer length, and the length of the adapter is shorter in the computing system when the computer chassis has a shorter length such that a depth of the computer chassis received in the cabinet is adjustable by using the adapter with an appropriate length.

* * * * *